US006846505B2

(12) United States Patent
Andersen et al.

(10) Patent No.: US 6,846,505 B2
(45) Date of Patent: Jan. 25, 2005

(54) ANTI-OXIDANT

(75) Inventors: Søren Møller Andersen, Sdr. Omme Hinnerup (DK); Torben Isak, Hinnerup (DK); Henrik Max Jensen, Give (DK); Jan Marcussen, Copenhagen K (DK); Shukun Yu, Malmoe (SE)

(73) Assignee: Danisco A/S, Copenhagen K (DK)

( * ) Notice: Subject to any disclaimer, the term of this patent is extended or adjusted under 35 U.S.C. 154(b) by 319 days.

(21) Appl. No.: 09/957,715

(22) Filed: Sep. 18, 2001

(65) Prior Publication Data

US 2002/0051840 A1 May 2, 2002

Related U.S. Application Data

(63) Continuation-in-part of application No. PCT/IB00/00358, filed on Mar. 16, 2000.

(30) Foreign Application Priority Data

Mar. 19, 1999 (GB) .............................................. 9906457

(51) Int. Cl.[7] ................................................ A23B 4/20
(52) U.S. Cl. ............................. 426/541; 426/7; 426/72; 426/73; 426/321; 426/335
(58) Field of Search ........................... 426/654, 72, 74, 426/321, 335, 7, 541, 73

(56) References Cited

U.S. PATENT DOCUMENTS

| 2,462,663 A | 2/1949 | Norris |
| 4,195,101 A | 3/1980 | Saito et al. |

FOREIGN PATENT DOCUMENTS

| GB | 2296717 | 7/1996 |
| JP | 48-39930 | 11/1978 |
| JP | 5740875 | * 7/1983 |
| JP | 42-6973 | 3/1992 |
| JP | 05139928 A | * 6/1993 |

OTHER PUBLICATIONS

Abe et al. Antioxidative activity of Kojic acid derivatives, J. of the Japanese Oil chemists Socity, 1970, vol. 19. (1), p. 23–27 (abstract only).*
Yi et al. Antioxidant activity of maltol, Kojic acid, levulinic acid, Korean J. of Food Science and Technology, (1982), 14 (3) p. 265–270 (abstract only).*
Takamizawa et al. Optimization of kojic acid production rate using the Box–wilson method, J. of Fermentation and Bioengineering, (1996, vol. 82 (4) pp. 414–416, abstract only.*
*Stevenson, T.T., Stenkmap, R.E. Jensen, L.H., Cochran, T.T., Shafizadeh, F., and Furneaux, R.H., The crystal structure of 1,5–anhydro–4–deoxy–D–glycero–hex–1–en–3–ulose, Carbohydrate Research, vol. 90, 319–325, 1981.
*P. Jarglish, Thesis, Darmstadt–Eberstadt 1980.
P. Jarglish, et al., Angewandte Chemie, vol. 94, No. 2, pp. 140–141, 1982.
H.E. Miller, A Simplified Method for the Evaluation of Antioxidants, The Journal of the American Oil Chemists' Society, vol. 48, No. 2, Feb. 1971.
Kaijiro Uchino et al.: "Kojic acid as an anti–speck agent" Agric. Biol., Chem., vol. 52, No. 10, pp. 2609–2610, 1988, referred to as XP–002143240.

(List continued on next page.)

Primary Examiner—Helen Pratt
(74) Attorney, Agent, or Firm—Frommer Lawrence & Haug LLP; Thomas J. Kowalski

(57) ABSTRACT

The present invention provides an anti-oxidant composition comprising a cyclic compound having formula I or a derivative thereof, wherein $R^1$ and $R^2$ are indepednetly selected from —OH, =O, wherein $R^3$ is a substituent comprising an —OH group; and wherein $R^4$ and $R^5$ are other than H; with the proviso that the compound is other than ascorbic acid.

9 Claims, 5 Drawing Sheets

Ascopyrone M     Ascopyrone P

Figure 1:
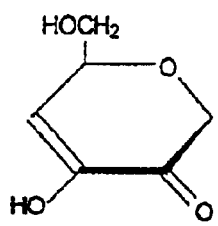
Figure 1:
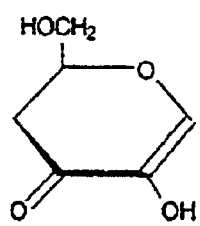
Figure 1:
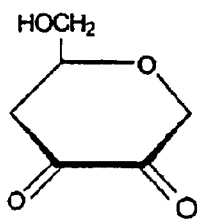
Figure 1:
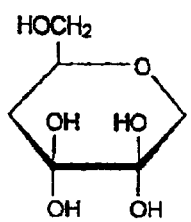
Figure 1:
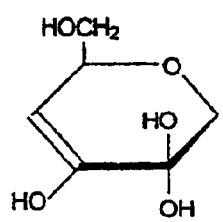
Figure 1:
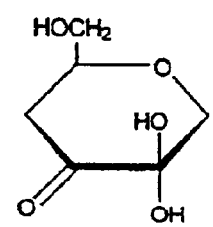

Ascopyrone T     Ascopyrone $T_1$     Ascopyrone $T_2$     Ascopyrone $T_3$

OTHER PUBLICATIONS

M.A. Baute, et al.: "Enzymic activity degrading 1,4–α–D–glucans to ascopyrones P and T In pezizales and tuberales" Phytochemistry, vol. 33, No. 1, pp. 41–45, 1993.

Patrizia Ciminiello, et al.: "Haliclonol, a new tetrahydropyranone from the Caribbean sponge *Haliclona hogarthi*" Heterocyles, vol. 34, No. 4, pp 765–770, 1992, referred to as XP–000925140.

Fred Shafizadeh et al.: "1,5–Anhydro–4–deoxy–D–glycero–hex–1–en–3–ulose and other pyrolysis products of cellulose" Carbohydrate Research, Vo. 67, No. 2, pp 433–447, 1978, referred to as XP–000925142.

Database FSTA [Online]; Ahmad T: "Studies on the degradation of saome pentoses and of 1,5–anhydro–OD–fructose, the product of the starch–degrading enzyme Na–1,4–glucan lyase." Database accession No. 96–1–09–b0084, cited in the application & Dissertation Abstracts International, C. 1996, Thessis Publ. 1995 Sveriges Lantbruksuniv., S–750 07 Uppsala, Sweden, vol. 57, No. 1, p. 231, Spring 1996.

Patent Abstracts of Japan, vol. 016, No. 09, Sep. 30 1996)Sep. 30, 1996 & JP–A–08 134090.

Patent Abstracts of Japan, vol. 016, No. 213 (C–0942), May 20, 1992 & JP–A–04 039937.

Patent Abstracts of Japan, vol. 014, No. 184 (C–0709), Apr. 13, 1990 & JP–A–02 031651.

C.F. Bourgeois, "Propriétés antioxygenès des tocophérols et du palmitate d'ascorbyle dans les matières grasses" Revue Francaise des Corps Gras, No. 9, pp. 353–356, Sep. 1981.

H.S. Olcott, "Antioxidants for Edible Fats and Oils", Oil and Soap, vol. 18, No. 4, pp. 77–80, 1941.

R.W. Riemenschneider et al., "The Thiocyanogen Values of the Methyl Esters of Oleic, Linoleic, and Linoleic Acids", Oil and Soap, vol. 18, No. 9, pp. 203–206, 1941.

H. Khäui, "The Functional (Technical) Uses of Vitamins", Proceedings of The University of Nottingham Residential Seminar on Vitamins, edited by M. Stein, London, England, pp. 111–143, 1971.

Anderson et al., "Structure of 1,5–anhydro–D–fructose: X–ray analysis of crystalline acetylated dimeric forms", J. Carbohydrate Chemistry, vol. 17, No. 7, pp. 1027–1035, 1998.

F.W. Lichtenthaler et al., "Selective Deacylation of Enol Esters with Hydroxylamine", Tetrahedron Letters, vol. 21, pp. 1425–1428, 1980.

\* cited by examiner

Ascopyrone M    Ascopyrone P

Ascopyrone T    Ascopyrone T$_1$    Ascopyrone T$_2$    Ascopyrone T$_3$

ANTI-OXIDANT

This application is a Continuation-in-Part of PCT/IB00/00358, filed Mar. 16, 2000, designating the U.S., published Sep. 28, 2000 as WO 00/56838 and claiming priority from GB 9906457.8 filed Mar. 19, 1999. All of the above-mentioned applications, as well as all documents cited herein and documents referenced or cited in documents cited herein, are hereby incorporated herein by reference.

The present invention relates to an anti-oxidant composition.

Anti-oxidants are required in many applications, for example, food preservation.

Food degradation from various sources are recognized in the literature and individual chemicals are known which will inhibit one aspect or another of degradation derived from a single source. Degradation, loss of colour or flavour of freshly cut plant parts are known to be caused by oxidation, enzymes, microbes, and metal ions. For example, acidulants are known to prevent microbial degradation by maintaining a relatively low pH environment but their effectiveness has been only temporary.

Fatty bodies have a tendency to be oxidized, even at ambient temperature and this oxidation (or rancidness) makes them acquire new properties, principally of taste or smell, which are generally considered as undesirable when these fatty bodies are incorporated, for example, in food compositions or in cosmetic compositions.

There are currently employed, in compositions containing fatty bodies or materials, protective agents which, in fact, play the role of an anti-oxidant.

Among known anti-oxidants, ascorbic acid is currently used which acts principally by direct absorption of oxygen. However, ascorbic acid is only very slightly soluble in fatty bodies and it is consequently difficult to use in order to protect the fatty material against oxidation. Moreover, although ascorbic acid may inhibit enzymatic browning it promotes non-enzymatic browning. Therefore it may not be used in many applications.

In order to solubilise the ascorbic acid molecule in fatty materials, it has been proposed to use various ascorbyl esters such as, for example, ascorbyl stearate, palmitate or laurate; see for example, the article of C. F. Bourgeois, *"Revue Francaise des Corps Gras"*, No. 9, pages 353–356 (September 1981).

It is also known, apart from their own anti-oxidant properties, that ascorbic derivatives also have the property of improving the activity of anti-oxidant agents such as tocopherols or cafeic acid and its esters, by favoring the regeneration of these anti-oxidant agents; see for example H. S. Olcott, *"Oil Soap"*, 18, (1941), 77 and U.S. Pat. No. 2,462,663.

Various improvements of these binary anti-oxidant agents, of the ascorbic derivatives+tocopherols or ascorbic derivatives+cafeic derivatives types have been proposed, by providing for the addition of a third constituent which again improves anti-oxidant effects. Among the third constituents of these ternary systems, there can be mentioned, principally, p-aminobenzoic acid (U.S. Pat. No. 2,462,633), phospholipids (R. W. Riemenschneider et al., *"Oil Soap"* 1941, 47) and amines (Klaui. *"The Functional (Technical) Uses of Vitamins"*, ed. by M. Stein, University of Nottingham Seminar Vitamins. London. England, 1971, page 110).

It is also known that sulfiting agents including sulfur dioxide, sodium sulfite, sodium and potassium bisulfite and sodium and potassium metabisulfite act as anti-oxidants and possess the ability to preserve vegetable food products. Sulfites have also been employed as preservatives in prepared foods such as flavored beverages, syrup concentrates, wine and vinegar as well as in the processing of sugar, corn starch and shrimp. Because of the recent increase in reported allergic reactions to these compounds, their use has fallen into disfavor. Regulatory actions involving the use of sulfites have been initiated and the former status of "generally recognized as safe" GRAS use of sulfites on raw foods and vegetables has been withdrawn by the U.S. Government Food and Drug Administration. Further labeling requirements have been imposed by the Food and Drug Administration on packaged food containing direct or indirect additions of sulfites.

Synthetic anti-oxidants for foodstuffs are known, such as dibutylhydroxytoluene (BHT) and butylhydroxyanisole (BHA). These compounds are, however, disadvantageous in that their amounts to be added to foodstuffs should be strictly controlled. For example, a maximum permissible content of BHT or BHA in fats and oils or in butter under the Japanese safety regulations must not exceed 0.02%, such limitation bringing about an insufficient anti-oxidative effect in some cases.

Besides the above named anti-oxidants for foodstuffs, several compounds have been proposed, for example alpha/omega-bis(2,5-dihydroxyphenyl)alkanes are disclosed in Japanese Patent Publication No. 42-6973, and hexahydrocurcumin or octahydrocurcumin are disclosed in Japanese Patent Publication No. 48-39930. The compounds, however, have drawbacks in their synthesis and effectiveness. Generally, anti-oxidants originating in natural products are preferred to synthetic anti-oxidants as food additives from the standpoint of safety and taste.

U.S. Pat. No. 4,195,101 proposes use as an anti-oxidant of 2',6'-dihydroxy-9-(2,5-dihydroxy-phenyl)octylphenone. It is taught that this compound serves as an anti-oxidant in foodstuffs, such as lard or the like, exhibiting higher anti-oxidative activities than the conventional anti-oxidant BHA. U.S. Pat. No. 4,195,101 discloses the preparation of the compound by extraction and separation of mace, or *Myristica fragrans* Hautt, (a known spice) successively with petroleum ether, diethylether, n-hexane and carbon tetrachloride, followed by column chromatographic separation.

According to a first aspect of the present invention there is provided an anti-oxidant composition comprising a cyclic compound having Formula I

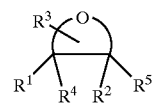

Formula I or a derivative thereof, wherein $R^1$ and $R^2$ are independently selected from —OH, =O, wherein $R^3$ is a substituent comprising an —OH group; and wherein $R^4$ and $R^5$ are other than H: with the proviso that the compound is other than ascorbic acid.

According to a second aspect of the present invention there is provided a process for prevention and/or reduction of oxidation of a material, the process comprising the step of contacting the material with a cyclic compound having Formula I Formula I

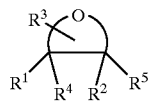

or a derivative thereof, wherein $R^1$ and $R^2$ are independently selected from —OH, =O, wherein $R^3$ is a substituent comprising an —OH group; and wherein $R^4$ and $R^5$ are other than H; with the proviso that the compound is other than ascorbic acid.

According to a third aspect of the present invention there is provided use of a compound for prevention and/or reduction of oxidation of a material, wherein the compound is a cyclic compound having Formula I Formula I

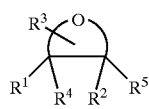

or a derivative thereof, wherein $R^1$ and $R^2$ are independently selected from —OH, =O, wherein $R^3$ is a substituent comprising an —OH group; and wherein $R^4$ and $R^5$ are other than H; with the proviso that the compound is other than ascorbic acid.

Preferably the material is a plant or fungal material.

The present invention may provide an anti-oxidant which on contact with plant or fungal material reduces and/or prevents the discolouration of the plant or fungal material. Thus, in further aspects, an anti-browning composition and a process and use of the same is provided.

According to a fourth aspect of the present invention there is provided an anti-browning composition comprising a cyclic compound having Formula I Formula I

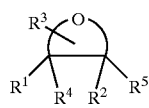

or a derivative thereof, wherein $R^1$ and $R^2$ are independently selected from —OH, =O, wherein $R^3$ is a substituent comprising an —OH group; and wherein $R^4$ and $R^5$ are other than H; with the proviso that the compound is other than ascorbic acid.

According to a fifth aspect of the present invention there is provided a process for prevention and/or reduction of browning of a plant or fungal material, the process comprising the step of contacting the plant or fungal material with a cyclic compound having Formula I Formula I

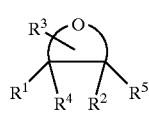

or a derivative thereof, wherein $R^1$ and $R^2$ are independently selected from —OH, =O, wherein $R^3$ is a substituent comprising an —OH group; and wherein $R^4$ and $R^5$ are other than H; with the proviso that the compound is other than ascorbic acid.

According to a sixth aspect of the present invention there is provided use of a compound for prevention and/or reduction of browning of a plant or fungal material, wherein the compound is a cyclic compound having Formula I Formula I

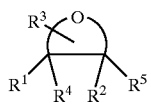

or a derivative thereof, wherein $R^1$ and $R^2$ are independently selected from —OH, =O, wherein $R^3$ is a substituent comprising an —OH group; and wherein $R^4$ and $R^5$ are other than H; with the proviso that the compound is other than ascorbic acid.

In the present specification, by the term "anti-browning composition" it is meant a composition which on contact with plant or fungal material, in particular fruit or vegetable material, reduces and/or prevents the discolouration of the material when compared to the material when not contacted with the composition.

Without being bound by theory it is believed that the anti-browning agent of the present invention reduces and/or prevents discolouration caused by chemical and enzymatic processed, for example by the inhibition of polyphenol oxidase.

Preferably, the compound of the present invention of the general formula II

Formula II

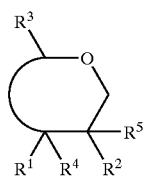

or a derivative thereof, wherein $R^1$, $R^2$, $R^3$, $R^4$, and $R^5$ are as defined above.

Preferably, the compound of the present invention of the general formula III

Formula III

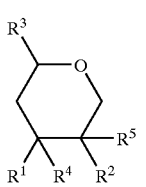

or a derivative thereof; wherein $R^1$, $R^2$, $R^3$, $R^4$, and $R^5$ are as defined above.

Preferably, the group $R^3$ of the general formula is or comprises an —$(CH_2)_n$—OH group, wherein n is from 1 to 20, or n is from 1 to 10, or n is from 1 to 5, or n=1, 2, or 3.

Preferably, the group $R^3$ of the general formula is or comprises an —$CH_2OH$ group.

Preferably, the groups $R^4$ and $R^5$ of the general formula are independently selected from —OH, =O or represent a bond with an adjacent atom on the ring of the cyclic compound.

The groups $R^4$ and $R^5$ of the general formula may independently be a hydrocarbyl group.

The term "hydrocarbyl group" as used herein means a group comprising at least C and H and may optionally comprise one or more other suitable substituents. Examples of such substituents may include halo-, alkoxy-, nitro-, hydroxy, carboxyl, epoxy, acrylics hydrocarbon, N-acyl, or cyclic group etc. In addition to the possibility of the substituents being a cyclic group, a combination of substituents may form a cyclic group. If the hydrocarbyl group comprises more than one C then those carbons need not necessarily be linked to each other. For example, at least two of the carbons may be linked via a suitable element or group. Thus, the hydrocarbyl group may contain hetero atoms. Suitable hetero atoms will be apparent to those skilled in the art and include, for instance, sulphur, nitrogen and oxygen.

The groups $R^4$ and $R^5$ of the general formula may independently be selected from alkyl, alkenyl, cycloalkyl and aryl or may together represent an alkylene.

Preferably, the cyclic compound of the general formula comprises a five or a six membered ring.

Preferably, the compound of the general formula is selected from ascopyrones, kojic acid, and mixtures thereof. Preferably, the compound of the general formula is a compound selected from Ascopyrone M, Ascopyrone P, Ascopyrone T, Ascopyrone $T_1$, Ascopyrone $T_2$, kojic acid, and mixtures thereof. Thus, according to a third aspect of the present invention there is provided an anti-oxidant comprising a compound selected from Ascopyrone M, Ascopyrone P, Ascopyrone T, Ascopyrone $T_1$, Ascopyrone $T_2$, kojic acid, and mixtures thereof.

The compounds of the present invention may provide strong anti-oxidant activity. For example, the compounds may prevent and/or delay the oxidation of carotenes or may prevent and/or delay the oxidative degradation of polyunsaturated fatty acids.

In particular ascopyrones and kojic acid of the present invention provide strong anti-oxidant activity.

The use of ascopyrones in the present invention has been found to be particularly advantageous for at least two reasons. Ascorbic acid is a standard anti-oxidant which is considered "food safe". Ascopyrones have been found by the applicant to be up to 100 times more potent as anti-oxidants than ascorbic acid. In other words, to achieve the same effect as a given amount of ascorbic acid, as little as one hundredth of the amount of ascopyrone may be required. Secondly, the production cost of ascopyrones may be approximately one tenth of that of ascorbic acid.

Ascopyrone is a known compound. In 1978 and 1981, a group of American scientists prepared ascopyrone P by pyrolysis of cellulose at the Wood Chemistry laboratory in Montana, with the intention of using ascopyrone P as a starting material for organic synthesis [1–2]. They characterized ascopyrone P by, for example, $^1H$ and $^{13}C$ NMR, and IR spectroscopy techniques. A 3-dimensional structure of ascopyrone P was provided. The yield of ascopyrone P obtained by pyrolysis was only 1.4% and complicated separation methods had to be used.

The natural occurrence of ascopyrone P in some species of very scarcely studied fungi collected from the Alps has been taught [3]. The occurrence of ascopyrone P in fungi immediately prompted the hypothesis that ascopyrone P would act as an antibiotic. However, ascopyrone P did not function satisfactorily as an antibiotic in the disclosed tests.

The preparation of ascopyrone P from anhydrofructose by a chemical method was disclosed in [4].

The six ascopyrone molecules the formulae of which are shown in FIG. 1 are known. However, their use as anti-oxidants is new.

Ascopyrone P and ascopyrone T can be produced from 1,5-anhydro-D-fructose by EDTA-sensitive dehydratases isolated from the fungi of the order Pezizales, such as *Plicaria leiocarpa* and *Anthracobia melaloma*, and the order of Tuberales, such as, *Tuber melanosporum*. Ascopyrone $T_1$, the dihydrate form of ascopyrone T; Ascopyrone $T_2$ and $T_3$, the tautomeric monohydrate forms of ascopyrone T.

Ascopyrone M can be produced from 1,5-anhydro-D-fructose by EDTA-sensitive dehydratases isolated from the fungi Morels, such as *Morchella vulgaris, Gyromitres pezizes*, such as *Peziza echinospora*.

Ascopyrone M, P and T can also be produced by treatment of 1,5-anhydro-D-fructose with alkali under mild conditions (Ahmand, T., 1995).

Preferably, the compound of the present invention is prepared by chemical means or enzymatic means.

When the compound of the present invention is prepared by chemical means, it may be prepared in accordance with one of the following methods 1. Ascopyrone P may be produced by treating 1,5-anhydro-D-fructose with nonaqueous acid at elevated temperature, for example at 70° C.
2. Ascopyrones (for example, ascopyrone P, T and M) may be produced from 1,5-anhydro-D-fructose by alkaline treatment according to T. Ahmad (*Studies on the degradation of some pentoses and of 1,5-anhydro-D-fructose, the product of the starch-degrading enzyme a-1,4-glucan lyase*. Thesis, The Swedish University of Agricultural Sciences, Sweden, 1995).

The structures of all ascopyrones produced were confirmed by NMR techniques.

Preferably, the compound of the present invention is prepared by enzymatic means as disclosed in [3]. For example ascopyrones (such as, ascopyrone P, T and M) may be produced from 1,5-anhydro-D-fructose using enzymatic methods as disclosed in [3].

When the compound of the present invention is prepared from 1,5-anhydro-D-fructose, preferably the 1,5-anhydro-D-fructose is prepared in accordance with GB-A-2296717. In other words, preferably the 1,5-anhydro-D-fructose is prepared by a method comprising treating an α-1,4-glucan with the enzyme α-1,4-glucan lyase characterised in that enzyme is used in substantially pure form.

Preferably, the anti-oxidant further comprises a compound selected from carotenes, including β-carotene, tocopherols, ascorbic acid, EDTA, derivatives and mixtures thereof.

Preferably, the anti-oxidant further comprises a compound selected from EDTA, citric acid.

Preferably, the anti-browning agent further comprises a compound selected from chelates, acidulants, derivatives and mixtures thereof.

Preferably the acidulants are selected from sulfites, EDTA, citric acid, derivatives and mixtures thereof.

Preferably the antibrowing agent is at a pH of from 2 to 7.

Preferably, the derivative of the compound of formula I is an ester. The term "ester" includes mono-, di-, tri- and poly-esters.

Preferably, the derivative of the compound of formula I is an ester wherein an ester linkage formed from the —OH group of the $R^3$ substituent. In this aspect preferably the derivatised $R^3$ substituent is a group of the formula —(CH$_2$)$_n$—OC(O)—(CH$_2$)$_p$CH$_3$, wherein n and p are independently of each other from 1 to 24, preferably from 1 to 20, preferably from 1 to 10, preferably from 1 to 5, or preferably 1, 2, or 3. In yet a further preferred embodiment the derivatised $R^3$ substituent is a group of the formula —CH$_2$—OC(O)—(CH$_2$)$_p$CH$_3$, wherein p is from 1 to 24, preferably from 1 to 20, or p is from 1 to 10, or p is from 1 to 5, or n=1, 2, or 3.

Preferably, the derivative of the compound of formula I is an ester wherein the $R^1$ substituent and/or the $R^2$ substituent is an —OH group and wherein an ester linkage formed from the —OH group of the $R^1$ substituent and/or the $R^2$ substituent. In this aspect preferably the derivatised $R^1$ substituent and/or the $R^2$ substituent is a group of the formula —$(CH_2)_n$—OC(O)—$(CH_2)_p CH_3$, wherein n and p are independently of each other from 1 to 24, preferably from 1 to 20, preferably from 1 to 10, preferably from 1 to 5, or preferably 1, 2, or 3. In yet a further preferred embodiment the derivatised $R^1$ substituent and/or the $R^2$ substituent is a group of the formula —$CH_2$—OC(O)—$(CH_2)_p CH_3$, wherein p is from 1 to 24, preferably from 1 to 20, or p is from 1 to 10, or p is from 1 to 5, or n=1, 2, or 3.

In a preferred aspect the compound of formula I is a diester wherein the $R^1$ substituent is an —OH group and wherein the ester linkages are formed from the —OH group of the $R^4$ substituent and from the —OH group of the $R^3$ substituent.

In a highly preferred aspect the compound of formula I is a compound of the formula

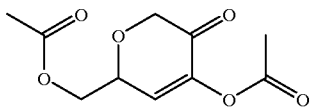

This compound (3,6-di-O-acetyl-1,5-anhydro-4deoxy-D-glycero-hex-3-enopyranose-2ulose) may be prepared in accordance with the teaching of Andersen et al. (1998), "Structure of 1,5-anhydro-D-fructose: X-ray analysis of crystalline acetylated dimeric forms, J. Carbohydr. Chem. 17: 1027–1035".

The aspect of the present invention wherein the derivative of the compound of formula I is an ester is particularly preferred because the compound may be lipophilic and/or may have both hydrophobic and hydrophilic properties. When the compound has both hydrophobic and hydrophilic properties the compound readily resides at a water/oil interface of an emulsion.

The residence of the compound at a water/oil interface of an emulsion may allow it to act as an emulsifier. Thus the present invention may further provide compounds having a dual functional effect. The compounds may act both as an anti-oxidant and as an emulsifier.

The emulsifying properties of compounds in accordance with the present invention were measured in Example 6.

Preferably, the plant or fungal material is a material from plants or fungi selected from carrots, peas, beans, potatoes, cauliflower, bananas, apples, pears, apricots, grapes, raisins, strawberries, apples and mushrooms.

Figure 2:
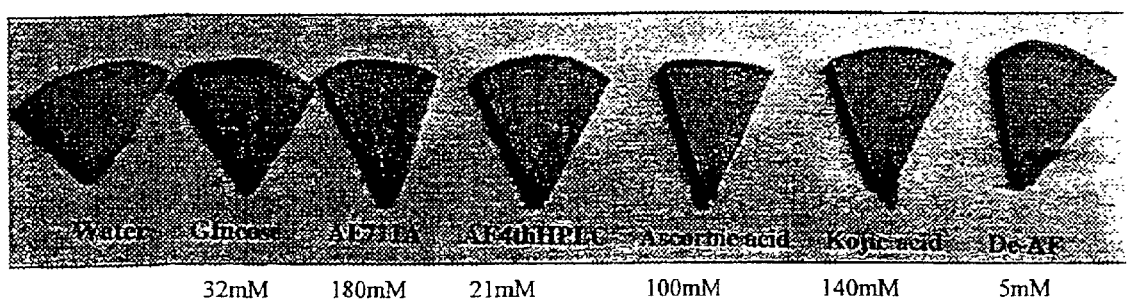
Figure 3:
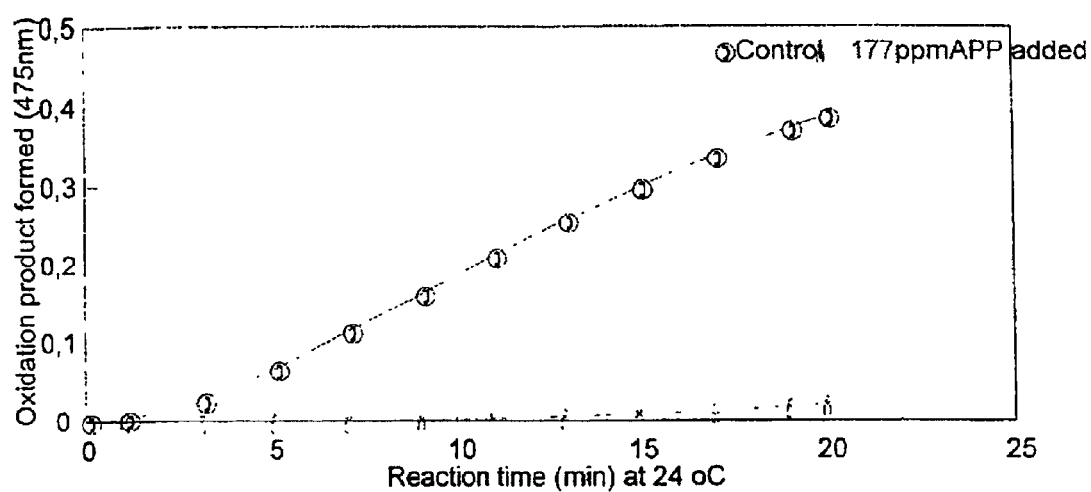
Figure 4:
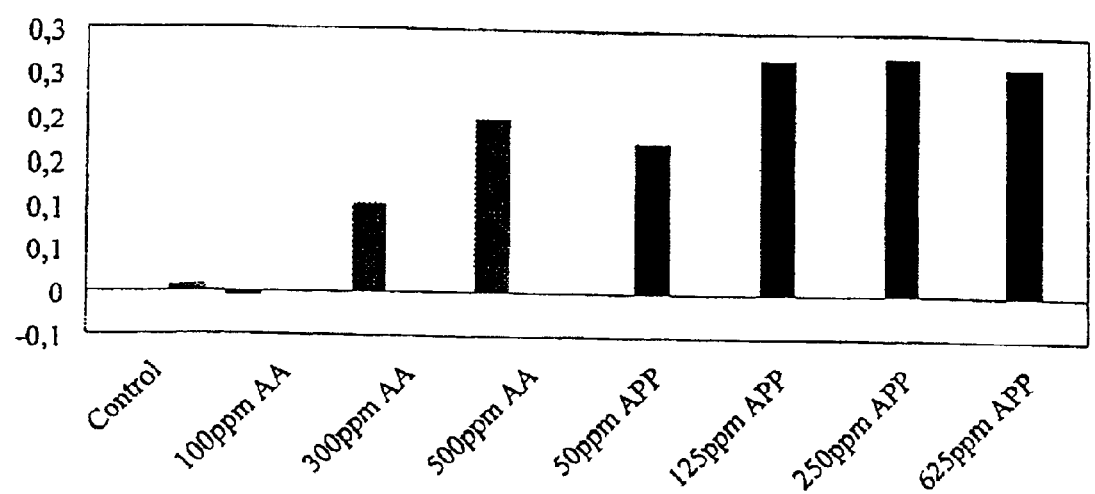
Figure 5:
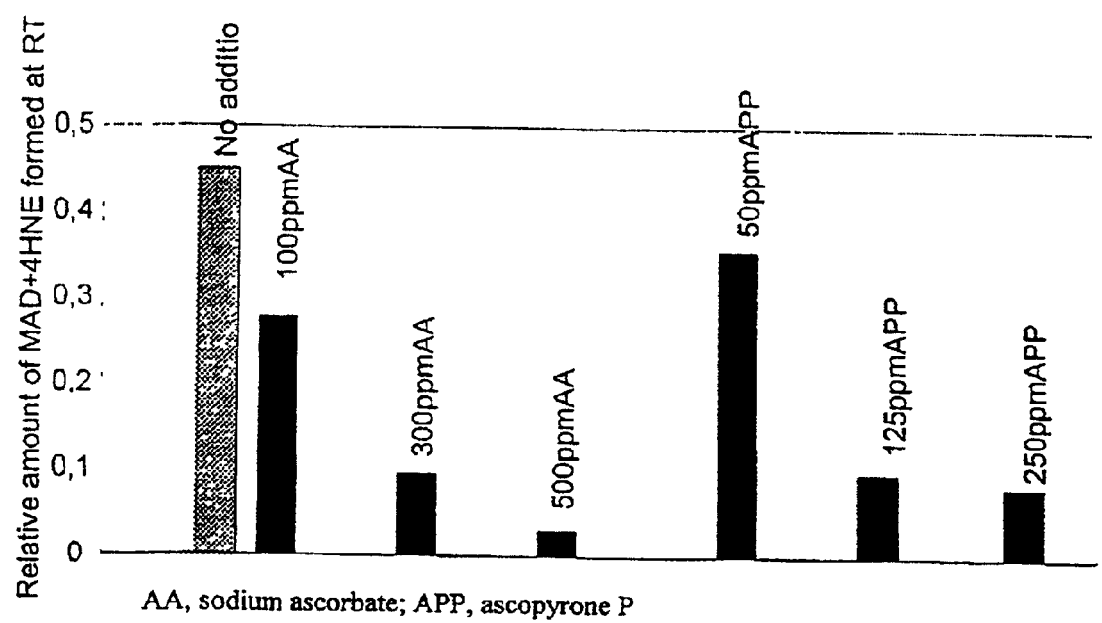

The invention will now be described, by way of example only, with reference to the accompanying drawings in which:

FIG. 1 illustrates compounds of the present invention.
FIG. 2 illustrates the present invention.
FIG. 3 illustrates the present invention.
FIG. 4 illustrates the present invention.
FIG. 5 illustrates the present invention.

EXAMPLES

Syntheses
General Procedures

Melting points were determined with a melting point apparatus (Büchi 510) and are uncorrected. Optical rotations were measured on an Perkin-Elmer 241 polarimeter by the Department of Organic Chemistry, Technical University of Denmark. $^1$H NMR and $^{13}$C NMR spectra were recorded with a Varian Gemini 200 MHz instrument (ambient temperature) and Bruker instrument AC 300 (ambient temperature). For NMR spectra the solvent peak was used as a reference. Microanalyses were carried out by the Chemical Laboratory II. University of Copenhagen. The progress of all reactions was monitored by thin layer chromatography using aluminium sheets precoated with silica gel 60 $F_{254}$ to a thickness of 0.2 mm. Compounds were detected with UV light (254 nm) and/or by spraying the sheets with a solution of 1.5% ammoniummolybdonate, 1% ceriumsulfate and 10% sulfuric acid, followed by heating. Column chromatography was conducted under pressure (2 bar) with silica gel (0.043–0.063 mm).

3,4,6-Tri-O-acetyl-1,5-anhydro-D-fructose oxime (2)

[litt=F. W. Lichtenthaler and P. Jarglis. *Tetrahedron Letters* 21 (1980) 1425–1428] To a solution of 2,3,4,6-tetra-O-acetyl-2-hydroxy-D-glucal (7.90 g, 23.9 mmol) in dry pyridine (40 mL, 496 mmol), HONH$_2$, HCl (5.85 g, 84.2 mmol) was added and the mixture was stirred for 24 h. The reaction mixture was concentrated and dissolved in CHCl$_3$ (300 mL). The organic phase was washed with 1 M HCl (aq., 75 mL), sat. aq. NaHCO$_3$ (75 mL) and H$_2$O (75 mL), dried (MgSO$_4$) and evaporated to a syrup of 2, (7.19 g, 99%). By addition of a small volume of EtOH the product crystallysed (4.43 g, 61%, mp 86–89° C.). Two recrystallisations from toluene afforded an analytical sample: mp 90–92° C.; $[\alpha]_D$–39.4° (c 1.3, CHCl$_3$) [Lit. mp 89–90° C., $[\alpha]_D$–39.0 (c 0.4, CHCl$_3$)].

$^1$H NMR (DMSO-d$_6$ at 2.49, 300 MHz) δ 1.99 (s, 3H, OCOC$\underline{H}_3$) 2.02 (s, 3H, OCOC$\underline{H}_3$), 2.03 (s, 3H, OCOC$\underline{H}_3$), 3.87 (ddd, J=3.0, 5.5 and 8.5, 1H. H-5), 4.03 (d, J=15.0, 1H, H-1), 4.05 (dd, J=3.0 and 12.0, 1H, H-6), 4.12 (dd, J=5.5 and 12.0, 1H, H-6'), 4.88 (d, J=15.0 1H, H-1'), 4.93 (dd, J=8.0 and 9.0, 1H, H-4), 5.54 (d, J=8.0 1H, H-3), 11.42 (s, 1H, NOH). $^{13}$C NMR (DMSO-d$_6$ at 39.6, 50.3 MHz) δ 20.6 (3×OCO$\underline{C}$H$_3$), 60.9 (C-1), 62.5 (C-6), 69.3 (C-4), 70.5 (C-3), 74.9 (C-5), 148.9 (C-2), 169.3–170.2 (3×O$\underline{C}$OCH$_3$).

Anal. Calcd for C$_{12}$H$_{17}$NO$_8$: C, 47.53; H, 5.65; N, 4.62. Found: C. 47.57; H. 5.56: N. 4.50.

3,4,6-Tri-O-acetyl-1,5-anhydro-D-fructose (3)

[litt=P. Jarglis, Thesis, Darmstadt-Eberstadt 1980] 3,4,6-Tri-O-acetyl-1,5-anhydro-D-fructose oxime (2) (5.00 g, 16.5 mmol) was dissolved in dioxane (100 mL) and NH$_4$OAc (13.0 g, 169 mmol) was added. The mixture was cooled on ice, 15% TiCl$_3$ (44 mL, 54 mmol) was added and the reaction mixture was stirred at rt for 3 h. The mixture was extracted with CHCl$_3$ (5×30 mL) and the combined organic phase was washed with saturated aqueous NaHCO$_3$ (70+50 mL). The combined aqueous phase was extracted with CHCl$_3$ (30 mL) and the combined organic phase was washed with H$_2$O (30 mL). The organic phase was dried (MgSO$_4$) and evaporated to a syrup of 3 (3.54 g, 75%). Upon addition of Et$_2$O, the product crystallises (1.29 g, mp 81–85° C.). Two recrystallisation from Et$_2$O afforded an analytical sample: mp 93–95° C.; $[\alpha]_D$–7.2 (c 1.5. CHCl$_3$) [Lit. mp 86–88° C., $[\alpha]_D$–10 (c 0.5, CHCl$_3$)]. $^1$ H NMR (CDCl$_3$ at 727, 300 MHz) δ 2.08 (s, 3H, OCOC$\underline{H}_3$) 2.10 (s, 3H, OCOC$\underline{H}_3$), 2.16 (s, 3H, OCOC$\underline{H}_3$), 3.99 (ddd, J=2.5, 5.0 and 9.0, 1H, H-5), 4.10 (d, J=15.5, 1H, H-1), 4.23 (dd, J=2.5 and 12.5, 1H, H-6), 4.27 (d, J=15.5. 1H, H-1'), 4.32 (d, J=5.0 and 12.5, 1H, H-6'), 5.34 (t, J=9.5, 1H, H-4), 5.42 (d, J=10.0, 1H, H-3). $^{13}$C NMR (CDCl$_3$ at 77.0. 75.5 MHz) δ 20.4, 20.7 (3×OCO$\underline{C}$H$_3$), 62.1 (C-6), 69.4 (C-4), 72.9 (C-1), 76.5 (C-5), 76.8 (C-3), 169.1, 169.8, 170.5 (3×O$\underline{C}$OCH$_3$), 196.3 (C-2).

Anal. Calcd for $C_{12}H_{16}O_8$: C, 50.00, H, 5.59. Found: C, 49.87; H, 5.56.

3,6-Di-O-acetyl-1.5-anhydro-D-glycero-hex-3-en-2-ulose (4)

[Litt=S. Andersen et al. J. Carbohydrate Chemistry, 17 (1998) 1027–1035, P. Jarglis and F. W. Lichtenthaler. Angew. Chem. 94 (1982) 140–141 with a benzoylated analog]. To a solution of 3,4,6-tri-O-acetyl-1,5-anhydro-D-fructose (3) (2.21 g, 7.67 mmol) in dry acetone (77 mL), anhydrous NaOAc (2.2 g) was added and the reaction mixture was stirred for 3 h. The salts were filtered off and washed with acetone. The filtrate was concentrated and purified by column chromatography (30 g silica, eluted with hexane-EtOAc. 2:1) to give 4 as a syrup (1.56 g, 89%): $^1$H NMR ($CDCl_3$ at 7.27, 300 MHz) δ 2.12 (s, 3H, $OCOCH_3$), 2.26 (s, 3H, $OCOCH_3$), 4.24 (dd, J=4.0 and 12.0, 1H, H-6), 4.25 (dd, J=2.0 and 16.5, 1H. H-1), 4.42 (dd, J=6.0 and 12.0, 1H, H-6'), 4.46 (d, J=16.5, 1H, H-1'), 4.80 (dddd, J=2.0, 2.0, 4.0 and 6.0, 1H, H-5), 6.59 (d, J=2.0, 1H, H-4). $^{13}$C NMR ($CDCl_3$ at 77.0, 50.3 MHz) δ 20.3–20.7 (2×$OCOCH_3$), 64.4 (C-6), 71.4 (C-1), 72.6 (C-5), 132.8 (C-4), 143.8 (C-3), 168.1–170.7 (2×$OCOCH_3$), 187.7 (C-2)

Anal. Calcd for $C_{10}H_{12}O_6$: C, 52.63; H, 5.30. Found: C, 52.01; H, 5.18.

1,5-Anhydro-D-glycero-hexo-2,3-diulose (5) (Ascopyrone T and M)

3,6-Di-O-acetyl-1,5-anhydro-D-glycero-hex-3-en-2-ulose (4) (2.98 g, 13.1 mmol) was added aqueous 4 M HCl (130 mL) and the reaction mixture was stirred for 24 h. The mixture was concentrated and co-concentrated with $H_2O$ (2×60 mL) to a syrup, which was purified by chromatography (60 g silica, eluted with EtOAc, then $CHCl_3$—MeOH. 4:1) to give 5 as an amorpheous solid (1.84 g, 97%). $^{13}$C NMR of hydrated 5 ($D_2O$, MeOH at 49.5 ppm, 50.3 MHz) δ 37.4 (C-4), 64.2 (C-6), 70.9 (C-1), 76.4 (C-5), 92.9 (C-3), 93.9 (C-2).

1,5-Anhydro-D-glycero-hex-1-en-3-ulose (6) (Ascopyrone P)

[Litt=F. Shafizadeh te al. Carbohydr. Res. 67 (1978) 433-447] 1,5-Anhydro-D-glycero-hexo-2,3-diulose (5) (1.04 g, 7.2 mmol) was dissolved in dry pyridine (100 mL) and 4 A molecular sieves (10.8 g) added. The mixture was heated at 120° C. in an atmosphere of $N_2$ for 1 h and concentrated in vacuo to give a syrup. The syrup was dissolved in $H_2O$ (50 mL) and 1 M HCl added, until pH 4–5. The aqueous phase was extracted with EtOAc (5×100 mL) and the combined organic phase was dried ($MgSO_4$) and evaporated to a brown syrup. Upon addition of EtOAc/hexane. 6 crystallised (0.1896 g, 18%, mp 90–95° C.) [Lit. mp 98.5–99° C.]. The motherliquer was purified by chromatography (20 g silica, eluted with EtOAc, then $CHCl_3$—MeOH, 4:1) to afford 5 (0.57 g) and 6 (0.0494 g). Total yield of 6: 23% (51% when subtracting recoved starting material). $^1$H NMR ($D_2O$, MeOH at 3.34 ppm, 300 MHz) δ 2.53 (dd, J=3.5 and 17.5, 1H, H-4), 2.87 (dd, J=14.5 and 17.5, 1H, H-4'), 3.79 (dd, J=5.5 and 12.5, 1H, H-6), 3.88 (dd, J=3.0 and 12.5, 1H, H-6'), 4.57 (m, 1H, H-5), 7.53 (s, 1H, H-1). $^{13}$C NMR ($D_2O$, MeOH at 49.5 ppm, 75.5 MHz) δ 37.7 (C4), 63.7 (C-6), 81.0 (C-5), 136,1 (C-2), 152.3 (C-1), 192.9 (C-3).

Evaluation

The following five methods were used to evaluate compounds in accordance with the present invention. Each of the tests show that the compounds are effective anti-oxidants and/or anti-browning agents 1. thiobarbituric acid (TBA) method was used to measure thiobarbituric acid reactive substances (TBARS), such as MDA (malondialdehyde) etc.

2. lipid peroxidation (LPO) method was used to measure MDA and 4-HNE (h4-hydroxynonenal).

Note: both MDA and 4-HNE are the oxidation products of polyunsaturated fatty acids from lipids.

3. β-carotene method was used to measure the protection of β-carotene oxidation by lipid peroxide in the presence of an added anti-oxidant.

4. DPPH (1,1-diphenyl-2-picrylhydrazyl) method was used to measure the radical scavenging activity of an anti-oxidant towards the radical DPPH.

5. polyphenol oxidase (PPO) method was used to measure the inhibition of polyphenol oxidase in vegetables, fruits and mushrooms.

Example 1

Compounds of the present invention were investigated as an anti-browning agent in vegetable and fruit products. FIG. 2 shows the effect of ascopyrones and kojic acid in preventing browning of apple slices. After a prolonged period, for example weeks or months, at room temperature it was apparent that ascopyrone and kojic acid were able to completely prevent browning. In contrast ascorbic acid was unable to do so (photo not shown).

FIG. 2 shows that PPO, the enzyme that is responsible for browning, is inhibited by compounds of the present invention such as ascopyrone and kojic acid.

Example 2

Principle and Goal: PPO is one of the enzymes involved in oxidative browning of vegetables and fruits. An efficient inhibitor is needed to inhibit the enzyme and therefore to prevent browning and oxidation. We found that Ascopyrone P (APP) is an efficient inhibitor for this purpose (see FIG. 3 and table 1).

Assay Conditions

Blank: To 20 µl PPO (20 units, from mushroom. Sigma product. EC 1.14.18.1) was added 0.45 ml water, 0.43 ml phosphate buffer (0.2M $Na_2HPO_4$—$NaH_2PO_4$, pH6.5), so the final volume was 0.9 ml Control: To 20 µl PPO was added 0.15 ml water, 0.43 ml phosphate buffer (0.2M $Na_2HPO_4$—$NaH_2PO_4$, pH6.5), then 0.3 ml tyrosine (1 mM, BDH product). Time course progress of the reaction was monitored at room temperature (24° C.) at 475 nm by using a Perkin Elmer UV/VIS Lambda 18 spectrophotometer.

Test: To 20 µl PPO was added 0.143 ml water, 7 µl APP (final 10 ppm), 0.430 ml phosphate buffer (0.2M $Na_2HPO_4$—$NaH_2PO_4$, pH6.5), then 0.3 ml tyrosine (1 mM, BDH product). Time course progress of the reaction was monitored as above.

The results obtained are shown in Table 1 and FIG. 3.

FIG. 3 shows the inhibition of ascopyrone P (APP) on mushroom polyphenol oxidase (PPO).

Table 1. Inhibition of 10 ppm APP on polyphenol oxidase (PPO) as indicated by very slow increase at absorbance 475nm compared to control. Higher values at OD475 nm indicate more browning product formation.

TABLE 1

Inhibition of 10 ppm APP on polyphenol oxidase (PPO) as indicated by very slow increase at absorbance 475 nm compared to control. Higher values at OD475 nm indicate more browning product formation.

| Reaction time (min) | Control (no APP) | Test (10 ppm APP added) |
|---|---|---|
| 0 | 0 | 0 |
| 1 | 0.003 | 0 |
| 3 | 0.025 | 0 |
| 5 | 0.066 | 0 |
| 7 | 0.114 | 0.0005 |
| 9 | 0.162 | 0.0017 |
| 11 | 0.210 | 0.0033 |
| 13 | 0.255 | 0.0056 |
| 15 | 0.298 | 0.0082 |
| 17 | 0.337 | 0.0122 |
| 19 | 0.372 | 0.0178 |
| 20 | 0.388 | 0.0209 |

Example 3

Principle and Goal: Carotenes are one of the pigments which may be used to give a healthy colour to food or drinks. They are therefore used as food colorant. β-Carotene is also the precursor for vitamin A. Carotenoid molecules are highly unsaturated and are prone to oxidative degradation; which is stimulated by light, enzymes, metals, and co-oxidation with lipid hydroperoxides.

In the system used, beta-carotene was exposed to oxygen and the oxidative intermediates of linoleic acid. The results indicated that the presence of APP in such system delayed the oxidative de-coloration of beta-carotene.

Assay Conditions

The assay was performed according to H. E. Miller (JAOSC (1970) 48: 91). The assay system consisted of beta-carotene, linoleic acid, and Tween 40. In the blank, no anti-oxidant was added, while in the tests, either APP in a concentration of 2.5–25 ppm or sodium ascorbate in a concentration of 100–500 ppm was added. The mixtures were incubated in the dark for the time and temperature indicated (see Table 2.1 and 2.2). The absorbance was then measured at 470 nm. The absorbance provided an indication of beta-carotene content. Lower OD470 nm values indicate more degradation of beta-carotene.

Table 2.1.—Effect of APP and sodium ascorbate in preventing the de-coloration of beta-carotene by oxygen and oxidative intermediates of linoleic acid after an incubation time at 37° C. for 161 min in the dark.

TABLE 2.1

Effect of APP and sodium ascorbate in preventing the de-coloration of betacarotene by oxygen and oxidative intermediates of linoleic acid after an incubation time at 37° C. for 161 min in the dark.

| APP concentrations (ppm) | 0 | 2.5 | 6.2 | 12.5 | 25 |
|---|---|---|---|---|---|
| The OD470 nm of the APP test | 0.056 | 0.264 | 0.314 | 0.322 | 0.326 |
| Sodium ascorbate concentrations (ppm) | 0 | 100 | 300 | 500 | |
| The OD470 nm of the ascorbate test | — | −0.01 | 0.096 | 0.191 | |

Table 2.2.—Effect of APP and sodium ascorbate in preventing the de-coloration of beta-carotene by oxygen and oxidative intermediates of linoleic acid after an incubation time at 37° C. for 161 min followed by an incubation at 24° C. for 17.5 hours in the dark.

TABLE 2.2

Effect of APP and sodium ascorbate in preventing the de-coloration of betacarotene by oxygen and oxidative intermediates of linoleic acid after an incubation time at 37° C. for 161 min followed by an incubation at 24° C. for 17.5 hours in the dark

| APP concentrations (ppm) | 0 | 2.5 | 6.2 | 12.5 | 25 |
|---|---|---|---|---|---|
| The OD470 nm of the APP tests | 0.006 | 0.173 | 0.270 | 0.274 | 0.263 |
| Sodium ascorbate concentrations (ppm) | 0 | 100 | 300 | 500 | |
| The OD470 nm of the ascorbate test | — | −0.006 | 0.102 | 0.200 | |

These data are illustrated in FIG. 4. FIG. 4 shows the effect of APP in preventing the oxidative degradation and de-coloration of beta-carotene. FIG. 4 shows that the compounds of the present invention such as APP may be around 100 times as effective as ascorbic acid in preventing the de-coloration of β-carotene.

Example 4

Principle and Goal: A major area for use of antioxidants in food-related products are their ability to prevent the oxidation of polyunsaturated fatty acids in lipids. The oxidation of lipids and fatty acids is a major problem in food. We found that APP, similar to other anti-oxidants, such as sodium ascorbate, was able to delay the oxidation of linoleic acid, as in the presence of APP the oxidative degradation products of malonaldehyde (MDA) and 4-hydroxynonenal (4HNE) were much lower than control (no anti-oxidant was added).

Assay Conditions: The assay of MDA and 4HNE was performed by the LPO method, using the assay kit from OXIS International, Inc. (Portland, Oreg., USA) and according to their protocol. The assay mixture for the blank contained linoleic acid and Tween 40. For the tests, APP or sodium ascorbate was added. After incubation at 24° C. in the dark for 10 days, the samples were assayed for MDA and 4HNE contents as indicated by their absorbance at 586 nm as given in Table 3. Higher OD586 nm values indicate higher content of MDA and 4HNE, and therefore more degradation of linoleic acid.

Table 3—APP delayed the production of MDA and 4HNE from linoleic acid.

TABLE 3

APP delayed the production of MDA and 4HNE from linoleic acid.

| APP concentration (ppm) | 0 | 2.5 | 6.2 | 12.5 |
|---|---|---|---|---|
| OD586 nm of the APP test | 0.451 | 0.358 | 0.100 | 0.084 |
| Sodium ascorbate concentration (ppm) | — | 100 | 300 | 500 |
| OD586 nm of the ascorbate test | — | 0.279 | 0.097 | 0.032 |

These data are illustrated in FIG. 5. FIG. 5 shows the effect of APP in delaying the oxidative degradation of the polyunsaturated fatty acid linoleic acid.

FIG. 5 shows the ability of APP in delaying the oxidative degradation of linoleic acid. It is seen that 6.2 ppm APP is almost as efficient as 300 ppm ascorbic acid.

Example 5

Use of Compound as Anti-Oxidant

Example 5.1

Use of Compound as an Anti-oxidant in a 50% Mayonnaise

50% mayonnaise is used for salads, open sandwiches, etc. in both the catering and the retail trades. The low oil content of 50% mayonnaise makes it suitable for low-calorie applications.

A typical mayonnaise composition is as follows:

| | |
|---|---|
| Soya oil | 50.0% |
| Tarragon vinegar (10%) | 4.0% |
| Egg yolk | 3.5% |
| Sugar | 3.0% |
| Salt | 1.0% |
| Potassium sorbate | 0.1% |
| Water | 35.2% |
| MAYODAN 602 | 3.0% |
| Lemon flavouring 10251 | 0.2% |

MAYODAN 602 ensures a fine, stable oil dispersion and the required viscosity, thereby providing 50% mayonnaise with a long shelf life.

Flavouring 10251 is a natural lemon flavouring which provides mayonnaise with the fresh taste of lemon.

Typically the mayonnaise is prepared by the following method:

1) Dry mix the MAYODAN 602, sugar and salt. Disperse in oil in a ratio of 1 part powder to 2 parts oil.
2) Add flavouring and potassium sorbate to the water and pour into the Koruma mixer. Add 1).
3) Add the egg yolk.
4) Add the oil continuously in a vacuum.
5) After ⅔ of the oil has been added (slowly), blend the tarragon vinegar with the remaining ⅓ of the oil, and add.

When the compound of the present invention is added to the mayonnaise as an anti-oxidant the results are comparable to the known food anti-oxidants GRINDOX 142 and GRINDOX 1029.

| GRINDOX 142: | |
|---|---|
| Ascorbyl palmitate | 10% |
| Propyl gallate | 20% |
| Citric acid | 10% |
| Food grade emulsifier | 60% |
| Form at 25° C. | paste |
| Colour | grey to pale brown |
| Density | 1.1 g/ml |

(All percentages are by weight)

| GRINDOX 1029: | |
|---|---|
| Ascorbyl palmitate | 20% |
| Natural tocopherols | 20% |
| Food grade emulsifier | 60% |
| Form at 25° C. | paste |
| Colour | light brown |
| Density at 25° C. | 1.0 g/ml |

(All percentages are by weight)

In the test procedure the anti-oxidant compounds were added to the mayonnaise to provide an anti-oxidant concentration in the order of about 500 ppm. The mayonnaise was then placed in a bomb calorimeter at temperature 80° C. containing pure $O_2$. An induction period to the onset of substantial oxidation of the product is then measured.

The results show that the compounds of the present invention are excellent food anti-oxidants and are comparable with the known foodstuffs anti-oxidants GRINDOX 142 or GRINDOX 1029.

Example 5.2

Use of Compounds as an Anti-oxidant in a Yoghurt Salad Dressing with 50% Oil

Yoghurt salad dressing with 50% oil is used for salads, potatoes, raw vegetable salad, meat, fish and boiled vegetables.

| Composition | |
|---|---|
| Soya oil | 50.0% |
| Yoghurt (plain) | 39.0% |
| Vinegar (10%) | 3.5% |
| Sugar | 3.0% |
| Egg yolk | 2.0% |
| Salt | 1.0% |
| Potassium sorbate | 0.1% |
| MAYODAN 525 | 1.4% |
| Acid masking flavouring 2072 | 0.02% |

MAYODAN 525 provides unique emulsion stability, prevents syneresis, ensures uniform oil dispersion and viscosity, improves tolerance to production processes and ensures a long shelf life.

Flavouring 2072 is a nature-identical, acid masking flavouring reducing the acidulated taste of dressing without affecting its pH value.

Process

1. Dry mix MAYODAN 525, sugar and salt. Disperse in oil in a ratio of 1 part powder to 2 parts oil.
2. Fill flavouring, potassium sorbate and yoghurt into the Koruma mixer. Add 1).
3. Add the egg yolk.
4. Add the oil continuously in a vacuum.
5. After ⅔ of the oil has been added (slowly), blend the vinegar with the remaining ⅓ of the oil, and add.
6. Add spices if required.

The compositions were tested as described above. The results show that the compounds of the present invention are excellent food anti-oxidants.

Example 6

Emulsifying Properties

Test of Compound of Interest as Emulgator in a w/o Emulsifier

Materials 1) 83.4% soya bean oil (84 ml)
   16.6% water (16.6 g)
2) 83.4% soya bean oil (84 ml)
   16.2% water (16.2 g)
   0.4% GRINDSTED® CITREM BC (0.4 g)
3) 83.4% soya bean oil (84 ml)
   16.2% water (16.2 g)
   0.4% DIMODAN® PVP (0.4 g)
4) 83.4% soya bean oil (84 ml)
   16.2% water (16.2 g)
   0.4% COMPOUND OF INTEREST (0.4 g)

15

Methods

1. The oil is heated to 60° C.
2. 84 ml warm soya bean oil (with or without emulsifier) is weighed in a 400 ml cup and then stirred (Heidolph, speed 2.5) in a waterbath at 60° C.
3. The weighed quantity of distilled water (pH 4.7) is added to the oil during while being stirred. The stirring is continued for 20 minutes, and the emulsion is kept at 60° C.

Just after the emulsification, a sample of the emulsion is studied in a microscope. The rest of the emulsion is poured into a cup which is placed at room temperature. Separation of water and possibly oil after some time is followed.

Results

|   | No emulsifier | GRINDSTED ® CITREM BC | DIMODAN ® PVP | Compound of Interest |
|---|---|---|---|---|
| Size of drops just after emulsification* | Large drops | Small and finely spread drops | Medium size drops - look stable | Small + medium size drops. Finely spread. |
| Stability** | 5 min | 60 min | 60 min | 20 min |

*photos from light microscope to follow.
**Time before approx. 15 ml water was separated from the emulsion.

Conclusions

The Compound of Interest acts as w/o emulsifier. The CoI's emulsification properties—assessed as the ability to create small water drops—are close to GRINDSTED® CITREM BS and better than DIMODAN® PVP. The emulsification with the CoI is considerably more stable than the control without emulsifier.

GRINDSTED® CITREM BC is Citric Acid Ester/Monoglyceride Blend

DIMODAN® PVP is Distilled Monoglyceride.

All publications mentioned in the above specification are herein incorporated by reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in chemistry or related fields are intended to be within the scope of the following claims.

The present invention will now be described by the following numbered paragraphs:

1. An anti-oxidant composition comprising a cyclic compound having Formula I

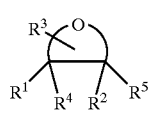

Formula I or a derivative thereof, wherein $R^1$ and $R^2$ are independently selected form —OH, =O;

wherein $R^3$ is a substituent comprising an —OH group; and, wherein $R^4$ and $R^5$ are other than H;

with the proviso that the compound is other than ascorbic acid.

2. A process for prevention and/or reduction of oxidation of a material, the process comprising the step of contacting the material with a cyclic compound having Formula I

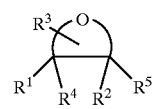

Formula I or a derivative thereof, wherein $R^1$ and $R^2$ are independently selected form —OH, =O;

wherein $R^3$ is a substituent comprising an —OH group; and, wherein $R^4$ and $R^5$ are other than H;

with the proviso that the compound is other than ascorbic acid.

3. Use of a compound for prevention and/or reduction of oxidation of a material, wherein the compound is a cyclic compound having Formula I

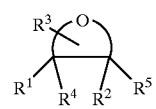

Formula I or a derivative thereof, wherein $R^1$ and $R^2$ are independently selected form —OH, =O;

wherein $R^3$ is a substituent comprising an —OH group; and, wherein $R^4$ and $R^5$ are other than H;

with the proviso that the compound is other than ascorbic acid.

4. An anti-browning composition comprising a cyclic compound having Formula I:

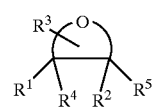

Formula I or a derivative thereof, wherein $R^1$ and $R^2$ are independently selected form —OH, =O;

wherein $R^3$ is a substituent comprising an —OH group; and, wherein $R^4$ and $R^5$ are other than H;

with the proviso that the compound is other than ascorbic acid.

5. A process for prevention and/or reduction of browning of a plant or fungal material, the process comprising the step of contacting the plant or fungal material with a cyclic compound having Formula I:

Formula I

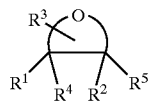

or a derivative thereof,
wherein $R^1$ and $R^2$ are independently selected form —OH, =O;
wherein $R^3$ is a substituent comprising an —OH group; and,
wherein $R^4$ and $R^5$ are other than H;
with the proviso that the compound is other than ascorbic acid.

6. Use of a compound for prevention and/or reduction of browning of a plant or fungal material, wherein the compound is a cyclic compound having Formula I Formula I

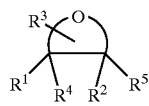

or a derivative thereof,
wherein $R^1$ and $R^2$ are independently selected form —OH, =O;
wherein $R^3$ is a substituent comprising an —OH group; and,
wherein $R^4$ and $R^5$ are other than H;
with the proviso that the compound is other than ascorbic acid.

7. The invention of any one of the preceding paragraphs wherein the cyclic compound is a compound having Formula II:

Formula II

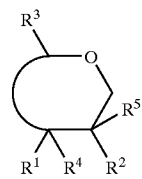

or a derivative thereof,
wherein $R^1$ and $R^2$ are independently selected form —OH, =O;
wherein $R^3$ is a substituent comprising an —OH group; and,
wherein $R^4$ and $R^5$ are other than H.

7. The invention of any of the preceding paragraphs wherein the cyclic compound is a compound having Formula III:

Formula III

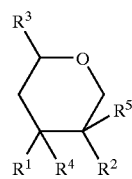

or a derivative thereof;

wherein $R^1$ and $R^2$ are independently selected form —OH, =O;
wherein $R^3$ is a substituent comprising an —OH group; and,
wherein $R^4$ and $R^5$ are other than H.

9. The invention of any one of the preceding paragraphs wherein $R^3$ is or comprises a —CH$_2$OH group.

10. The invention of any one of the preceding paragraphs wherein $R^4$ and $R^5$ are independently selected from —OH, =O or represent a bond with an adjacent atom on the ring of the cyclic compound.

11. The invention of any one of the preceding paragraphs wherein the cyclic compound comprises a five or a six membered ring.

12. The invention of any one of the preceding paragraphs wherein the compound is selected from Ascopyrone M, Ascopyrone P, Ascopyrone T, Ascopyrone $T_1$, Ascopyrone $T_2$, kojic acid, and mixtures thereof.

13. The invention of any one of the preceding paragraphs wherein the anti-oxidant composition further comprises a compound selected from tocopherols, ascorbic acid, EDTA, derivatives and mixtures thereof.

14. The invention of any one of the preceding paragraphs wherein the anti-browning composition further comprises a compound selected from chelates, acidulants, derivatives and mixtures thereof.

15. The invention according to paragraph 14 wherein the acidulants are selected from sulfites, EDTA, cirtric acid, derivatives and mixtures thereof.

16. A process for the preparation of a cyclic compound having Formula I for use in the invention according to any one of the preceding paragraphs, wherein the compound is prepared by a chemical means.

17. A process for the preparation of a cyclic compound having Formula I for use in the invention according to any one of the preceding paragraphs, wherein the compound is prepared by enzymatic means.

18. The invention according to any one of the preceding paragraphs wherein the derivative of the compound of formula I is an ester.

References

[1] Shafizadeh, F., Furneaux R. H., Stevenson, T. T., and Cochran, T. G. 1,5-anhydro-4-deoxy-D-glycero-hex-1-en-3-ulose and other pyrolysis products of cellulose. Carbohydr. Res. 67(1978):433–447.

[2] Stevenson, T. T., Stenkmap, R. E., Jensen, L. H., Cochran, T.T., Shafizadeh, F., and Furneaux R. H., and. The crystal structure of 1,5-anhydro4-deoxy-D-glycero-hex-1-en-3-ulose. Carbohydr. Res. 90(1981): 319–325.

[3] M.-A. Baute, G. Deffieux, J. Vercauteren, R. Baute, and A. Badoc. Enzymatic activity degrading 1,4-α-glucans to Ascopyrones P and T in *Pezizales ad Tuberales. Phytochemistry,* 33 (1991): 41–45.

[4] T. Ahmad, *Studies on the degradation of some pentoses and of 1,5-anhydro-D-fructose, the product of the starch-degrading enzyme a-1,4-glucan lyase.* PhD Thesis, The Swedish University of Agricultural Sciences, Sweden, 1995.

We claim:

1. A process for prevention and/or reduction of oxidation of a material, the process comprising the step of contacting the material with an isolated cyclic compound selected from

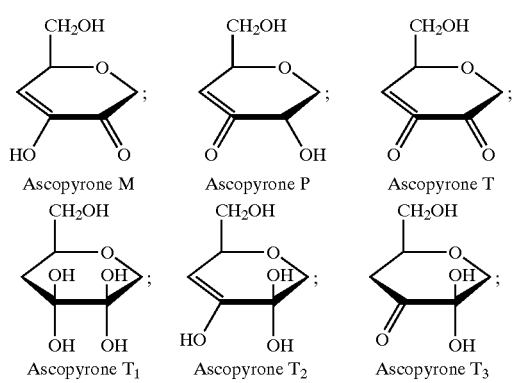

and ester derivatives and mixtures thereof.

2. The process of claim 1 wherein the compound is selected from Ascopyrone M, Ascopyrone P, Ascopyrone T, Ascopyrone $T_1$, Ascopyrone $T_2$, and ester derivatives and mixtures thereof.

3. The process of claim 1 wherein the anti-oxidant composition further comprises a compound selected from tocopherols, ascorbic acid, EDTA, derivatives and mixtures thereof.

4. A process for prevention and/or reduction of browning of a plant or fungal material, the process comprising the step of contacting the plant or fungal material with a cyclic compound selected from

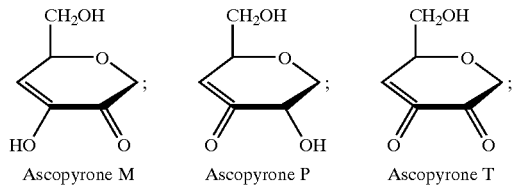

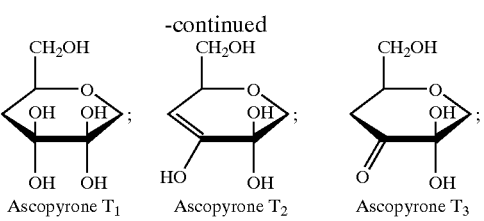

and ester derivatives and mixtures thereof.

5. The process of claim 4 wherein the anti-browning composition further comprises a compound selected from chelates, acidulants, derivatives and mixtures thereof.

6. The process of claim 5 wherein the acidulants are selected from sulfites, EDTA, citric acid, derivatives and mixtures thereof.

7. The process of claim 4 wherein the compound is selected from Ascopyrone M, Ascopyrone P, Ascopyrone T, Ascopyrone $T_1$, Ascopyrone $T_2$, and ester derivatives and mixtures thereof.

8. A process for prevention and/or reduction of oxidation of a material, the process comprising the step of contacting the material with a cyclic compound selected from Ascopyrone P and ester derivatives and mixtures thereof.

9. A process for prevention and/or reduction of browning of a plant or fungal material, the process comprising the step of contacting the plant or fungal material with a cyclic compound selected from Ascopyrone P and ester derivatives and mixtures thereof.

\* \* \* \* \*